Figure 1:
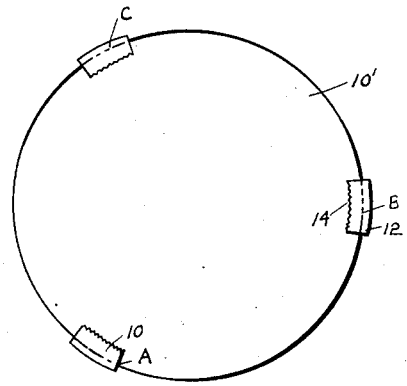

Dec. 13, 1932.  C. GEBHARD  1,890,460

TEMPORARY CAP FOR CUPS, ETC

Filed March 7, 1931

Carl Gebhard. INVENTOR.

Patented Dec. 13, 1932

1,890,460

UNITED STATES PATENT OFFICE

CARL GEBHARD, OF LOS ANGELES, CALIFORNIA

TEMPORARY CAP FOR CUPS, ETC.

Application filed March 7, 1931. Serial No. 520,889.

One of the objects of the present invention is to provide means for closing the tops of culinary vessels such as cups.

This invention relates to improvements in cups and similar vessels holding liquid contents which are subjected to the hazard of spilling when the cup or other vessel is carried about.

Another object of the present invention is to provide a simple, efficient and inexpensive device in the form of a flat lid or cover for the upper edge of a cup or similar vessel designed to completely cover the liquid contents of the cup.

A further object of this invention is to provide a paper disk having a flat contact with the upper edge of a cup or similar vessel for the purpose of being retained upon this cup or vessel as the latter is carried from counter to table or from the kitchen to any part of the room where the person is dining who is to receive the cup or vessel.

It is well known that in most homes, in public restaurants and eating places in general cups of coffee, tea or other liquid contents served hot or cold have to be carried directly from the stove or place where same is poured out into the cup or vessel to the table where the cup or vessel is ultimately to be deposited. In carrying the cup about the contents thereof will usually spill, or at least part of the contents will spill out and stream down the sides of the cup, which is usually attended with unsanitary conditions.

To overcome as well as to prevent this hazard of the contents of the cup or other vessel being partially spilled out as the cup is being carried about is the main purpose of the present invention. There is provided a cheaply constructed yet substantial disk lid provided with a series of depending springmetal clips designed to be snapped into engagement with the side of the cup or vessel to allow the flat disk to make flat contact with the upper edge of the cup, to thereby seal the contents of the cup against spilling even when the cup is being transported.

With the above and other objects in view my invention consists in the combination, arrangement and details of construction disclosed in the drawing and specification, and then more particularly pointed out in the appended claims.

Figure 2:
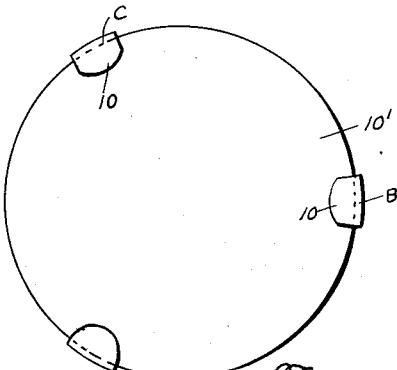
Figure 3:
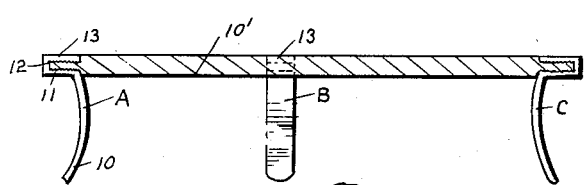
Figure 4:
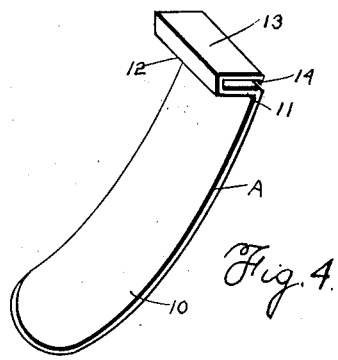
Figure 5:
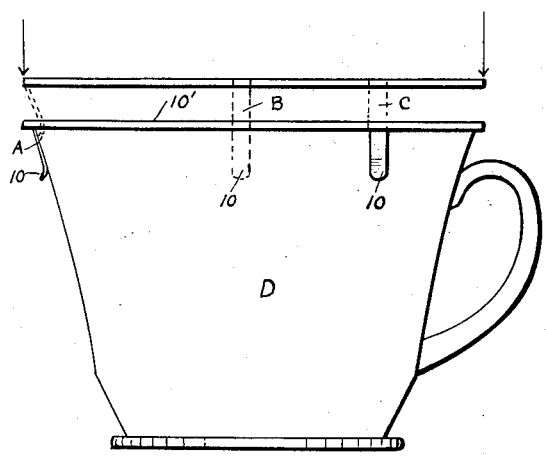

In the drawing, which is merely illustrative of my invention and in which similar reference characters designate similar parts thruout the respective views, Figure 1 is a top plan view of my invention, Figure 2 is a bottom plan view thereof, Figure 3 is a cross-section taken thru my invention showing the spring clips attached thereto as a retaining means, Figure 4 is a perspective view of one of the retaining clips to be described, Figure 5 is a side elevation of a cup showing the lid attached in proper position thereto.

The means employed to cover the upper edge of the cup D is as follows. I stamp out a number of paper disks, of the same size. Any of these paper disks 10' will be of a convenient diameter to snugly overlie and contact the upper face of the cup. In order to secure the paper lid or disk upon the cup or vessel and against displacement therefrom I provide a circumferential series of retaining elements in the form of yieldable resilient or spring-metal stamped-out clips of which three in number are shown, designated respectively A, B and C.

Each clip is formed with a preferably bifurcated base portion consisting of a pair of yieldably parallel lugs 11 and 13 and a right-angular ear 12 joining these lugs. The clip proper is designated 10 and its outer terminal curves outwardly causing the plurality of clips to flare at their extreme outer ends. The bulge of each clip is such, as is shown in Figure 3, that they slightly taper as the several clips extend or depend downwardly from the edge of the paper disk 10'.

The outer edges of the lugs 11 and 13 will preferably be serrated as at 14 so as to have sharp prongs or teeth. It is designed to completely countersink or imbed the clips A B C etc. into the opposing sides or faces of the disk 10'. This is done by pressing them so firmly into the soft texture of the paper disk that they will sink thereinto so their respective outer faces will be flush with the opposing sides of the disk. In this way the disk maintains a flat contacting surface to the upper edge of the cup. The operator takes hold of the disk 10' and presses the clips against the upper edge of the cup until all clips snap and spring back against the side of the cup A, and then the disk being in flat contact with the upper edge of the cup will hold the contents thereof against spilling when the cup is carried about. The paper disk can be quickly lifted and removed from the cup when it is desired to drink the contents thereof. I do not limit myself to the exact details save as set forth in appended claims.

What I desire to patent and claim is as follows:—

1. In combination with a cup, a paper cap fitting in flat contact therewith so as to cover the same snugly to prevent spilling of the contents thereof, and resilient clips carried dependingly by said cap engaging frictionally the side of the cup as a means of retention thereon.

2. In combination with a cup, a paper cap having a flat fit upon the outer edge thereof so as to cover the same, and a plurality of curved metal clips dependingly carried by said cup and having a spring snapping action for contact with the side of the cup to retain the cap upon the cup.

3. In combination with a cup, a thin paper cap therefor, overlying the top edge thereof, a series of circumferentially spaced apart spring-metal clips carried by said cap and permanently bent downwardly for engaging the peripheral side of the cup to hold the cap in flat closed position upon the upper edge of the cup.

4. In combination with a liquid-carrying cup, a paper lid having a flat contact therewith to prevent spilling of the contents thereof, a series of circumferentially spaced apart curved resilient depending clips carried marginally by said lid, the terminals of said clips converging and at their outermost extremities curving outwardly, the circumferential spread of the clips collectively being of a diameter less than that of the periphery of the cup to which the lid is to be attached, so as to necessitate snapping the clips into contact with the outer face of the cup when the lid is pressed down into engagement with the vessel.

5. A device as described consisting of a paper flat disk, and a series of depending curved resilient clips and means securing the clips upon the disk in imbedded relation therein.

6. As a new article of manufacture a paper disk having a plurality of curved resilient clips flaring at their terminals, each clip having a base portion made bifurcated to provide a pair of spaced parallel lugs having serrations countersunk into opposite sides of the disk, whereby the base portion is flush with these opposing sides, the clips being yieldable.

In witness whereof he has hereunder set his hand this 17th day of February, 1931.

CARL GEBHARD.